US007718281B2

(12) United States Patent
Miyazaki et al.

(10) Patent No.: US 7,718,281 B2
(45) Date of Patent: May 18, 2010

(54) PLASMA DISPLAY PANEL

(75) Inventors: Akinobu Miyazaki, Osaka (JP); Masaki Nishinaka, Osaka (JP); Seiji Nishitani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/791,085

(22) PCT Filed: Sep. 29, 2006

(86) PCT No.: PCT/JP2006/319464

§ 371 (c)(1),
(2), (4) Date: May 18, 2007

(87) PCT Pub. No.: WO2007/040177

PCT Pub. Date: Apr. 12, 2007

(65) Prior Publication Data

US 2007/0296336 A1 Dec. 27, 2007

(30) Foreign Application Priority Data

Oct. 3, 2005 (JP) ............................ 2005-289788

(51) Int. Cl.
*B32B 15/04* (2006.01)
*H01J 15/02* (2006.01)

(52) U.S. Cl. ........................ 428/701; 428/690; 313/584

(58) Field of Classification Search ................. 428/428, 428/432, 697, 702, 690, 701; 430/320; 501/32; 313/582, 583, 584
See application file for complete search history.

(56) References Cited

U.S. PATENT DOCUMENTS 5,977,708 A 11/1999 Amatsu et al.
6,207,268 B1 * 3/2001 Kosaka et al. ............... 428/325
7,105,256 B2 9/2006 Fukushima
7,326,666 B2 2/2008 Yamamoto et al.
7,422,503 B2 9/2008 Fujitani et al.

(Continued)

FOREIGN PATENT DOCUMENTS

JP 9-050759 A 2/1997

(Continued)

OTHER PUBLICATIONS

Hiroi translation.*

(Continued)

*Primary Examiner*—Timothy M Speer
*Assistant Examiner*—Lauren Robinson
(74) *Attorney, Agent, or Firm*—McDermott Will & Emery LLP

(57) ABSTRACT

A plasma display panel (PDP) is made of front panel (2) and rear panel (10). The front panel includes display electrodes (6), dielectric layer (8), and protective layer (8) that are formed on glass substrate (3). The rear panel includes address electrodes (12), barrier ribs (14), and phosphor layers (15) that are formed on rear glass substrate (11). The front panel and the rear panel are faced with each other, and the peripheries thereof are sealed to form discharge space (16) therebetween. Primary dielectric layer (13) is provided to cover address electrodes (12), and barrier ribs (14) are formed on primary dielectric layer (13). Primary dielectric layer (13) is made of dielectric glass containing at least bismuth oxide and having a softening point exceeding 550° C.

4 Claims, 1 Drawing Sheet

U.S. PATENT DOCUMENTS

| | | | | |
|---|---|---|---|---|
| 2002/0036466 | A1 * | 3/2002 | Tanaka et al. | 313/586 |
| 2002/0175622 | A1 * | 11/2002 | Otani et al. | 313/518 |
| 2003/0129546 | A1 * | 7/2003 | Mitsui et al. | 430/320 |
| 2004/0232840 | A1 * | 11/2004 | Aoki et al. | 313/582 |

FOREIGN PATENT DOCUMENTS

| | | | |
|---|---|---|---|
| JP | 9-50769 | A | 2/1997 |
| JP | 10-275564 | A | 10/1998 |
| JP | 2001-48577 | A | 2/2001 |
| JP | 2001-297691 | A | 10/2001 |
| JP | 2002-53342 | A | 2/2002 |
| JP | 2003-128430 | | 5/2003 |
| JP | 2003-128430 | A | 5/2003 |
| JP | 2003-128430 | * | 8/2003 |
| JP | 2005-005261 | A | 1/2005 |
| JP | 2005-5261 | A | 1/2005 |
| JP | 2005-8512 | A | 1/2005 |
| JP | 2005-070079 | | 3/2005 |
| JP | 2005-216593 | A | 8/2005 |
| KR | 10-2005-0021240 | | 3/2005 |
| KR | 10-2005-0043711 | | 5/2005 |

OTHER PUBLICATIONS

Korean Office Action issued in Korean Patent Application No. KR 10-2007-7017386 dated Jun. 23, 2008.

Korean Office Action Issued in Korean Patent Application No. KR 10-2007-7017386 dated Dec. 30, 2008.

Chinese Office Action issued in Chinese Patent Application No. CN 2006800038492 dated Apr. 17, 2009.

* cited by examiner

PLASMA DISPLAY PANEL

TECHNICAL FIELD

The present invention relates to a plasma display panel for use in a display device and the like.

RELATED APPLICATIONS

This application is the U.S. National Phase under 35 U.S.C. §371 of International Application No. PCT/JP2006/319464, filed on Sep. 29, 2006, which in turn claims the benefit of Japanese Application No. 2005-289788, filed on Oct. 3, 2005, the disclosures of which Applications are incorporated by reference herein.

BACKGROUND ART

A plasma display panel (herein after referred to as a PDP) can achieve higher definition and have a larger screen. Thus, a television screen using a PDP approx. 65 inch in diagonal is commercially available.

A PDP is basically made of a front panel and a rear panel. The front panel includes a glass substrate made of sodium borosilicate glass by the float method, display electrodes that are made of stripe-like transparent electrodes and bus electrodes formed on the principle surface of the glass substrate on one side thereof, a dielectric layer covering the display electrodes and working as a capacitor, and a protective layer that is made of magnesium oxide (MgO) formed on the dielectric layer. On the other hand, the rear panel is made of a glass substrate, stripe-like address electrodes formed on the principle surface of the glass substrate on one side thereof, a primary dielectric layer covering the address electrodes, barrier ribs formed on the primary dielectric layer, and phosphor layers formed between the respective barrier ribs and emitting light in red, green, or blue.

The front panel and rear panel are hermetically sealed with the electrode-forming sides thereof faced with each other. A Ne—Xe discharge gas is charged in the discharge space partitioned by the barrier ribs, at a pressure ranging from 400 to 600 Torr. For a PDP, selective application of image signal voltage to the display electrodes makes the electrodes discharge. Then, the ultraviolet light generated by the discharge excites the respective phosphor layers so that they emit light in red, green, or blue to display color images.

Silver electrodes are used for the bus electrodes in the display electrodes to ensure electrical conductivity thereof. Low-melting glass essentially consisting of lead oxide is used for the dielectric layer. The examples of a lead-free dielectric layer addressing recent environmental issues are disclosed in Japanese Patent Unexamined Publication Nos. 2003-128430, 2002-053342, 2001-048577, and H09-050769. Further, an example of using binding glass that contains bismuth oxide and has a low softening point for the primary dielectric layer covering the address electrodes is disclosed in Japanese Patent Unexamined Publication No. H10-275564.

Because a PDP can achieve higher definition and have a larger screen, a television screen using a PDP approx. 65 inch in diagonal is commercially available. Recently, with advancement of application of PDPs to high definition televisions having scanning lines at least twice as many as conventional televisions compliant with the National Television System Committee (NTSC) system, PDPs containing no lead to address environmental issues have been required.

However, such compliance of a PDP with high definition increases the numbers of scanning lines and display electrodes, and decreases the spacing between the display electrodes. These changes decrease the pitch and width of the barrier ribs of the rear panel. Thus, defective shapes of the barrier ribs are likely to occur, and affect the display quality.

SUMMARY OF THE INVENTION

A plasma display panel (PDP) of the present invention is made of a front panel and a rear panel. The front panel includes display electrodes, a dielectric layer, and a protective layer that are formed on a glass substrate. The rear panel includes address electrodes, barrier ribs, and phosphor layers that are formed on a substrate. The front panel and the rear panel are faced with each other, and the peripheries thereof are sealed to form a discharge space therebetween. A primary dielectric layer is provided to cover the address electrodes, and the barrier ribs are formed on the primary dielectric layer. The primary dielectric layer is made of dielectric glass containing at least bismuth oxide and having a softening point exceeding 550° C.

Such a structure inhibits generation of bubbles in the interface between the address electrodes and the primary dielectric layer, and in the primary dielectric layer. This inhibition can maintain high accuracy of the shape of the barrier ribs formed on the primary dielectric layer, and provide an eco-friendly PDP with excellent display quality.

Figure 1:
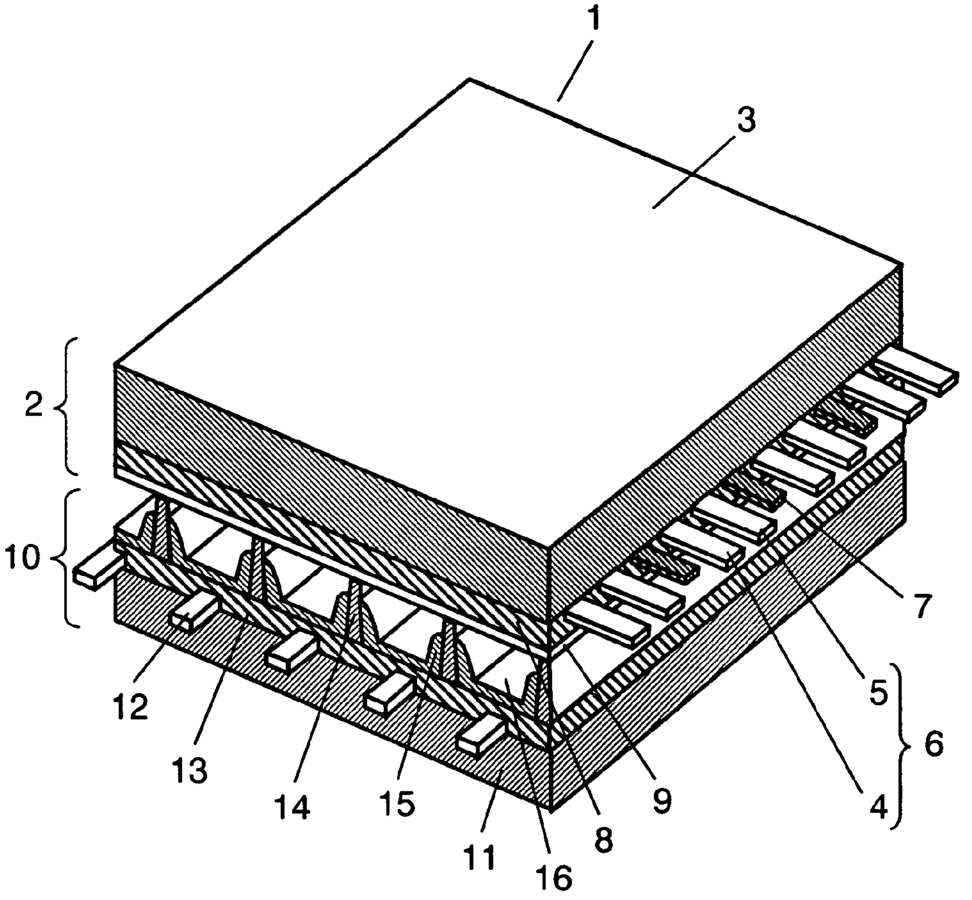
FIG. 1 is a perspective view illustrating a structure of a plasma display panel (PDP) in accordance with an exemplary embodiment of the present invention.

| REFERENCE MARKS IN THE DRAWINGS | |
|---|---|
| 1 | Plasma display panel (PDP) |
| 2 | Front panel |
| 3 | Front glass substrate |
| 4 | Scan electrode |
| 4a, 5a | Transparent electrode |
| 4b, 5b | Metal bus electrode |
| 5 | Sustain electrode |
| 6 | Display electrode |
| 7 | Black stripe (lightproof layer) |
| 8 | Dielectric layer |
| 9 | Protective layer |
| 10 | Rear panel |
| 11 | Rear glass substrate |
| 12 | Address electrode |
| 13 | Primary dielectric layer |
| 14 | Barrier rib |
| 15 | Phosphor layer |
| 16 | Discharge space |
| 81 | First dielectric layer |
| 82 | Second dielectric layer |

DETAILED DESCRIPTION OF PREFERRED EMBODIMENT

Hereinafter, a description is provided of a plasma display panel (PDP) in accordance with the exemplary embodiment of the present invention, with reference to the accompanying drawings.

Exemplary Embodiment

FIG. 1 is a perspective view illustrating a structure of a PDP in accordance with the exemplary embodiment of the present invention. The PDP is similar to a general alternating-current surface-discharge PDP in basic structure. As shown in FIG. 1, for PDP 1, front panel 2 including front glass substrate 3, and rear panel 10 including rear glass substrate 11 are faced with each other, and the outer peripheries thereof are hermetically sealed with a sealing material including glass frits. Into discharge space 16 in sealed PDP 1, a discharge gas including Ne and Xe is charged at a pressure ranging from 400 to 600 Torr.

On front glass substrate 3 of front panel 2, a plurality of rows of display electrodes 6, each made of a pair of stripe-like scan electrode 4 and sustain electrode 5, and black stripes (lightproof layers) 7 are disposed in parallel with each other. Formed on front glass substrate 3 is dielectric layer 8 that covers display electrodes 6 and lightproof layers 7 and works as a capacitor. Further on the surface of the dielectric layer, protective layer 9 including magnesium oxide (MgO) is formed.

On rear glass substrate 11 of rear panel 10, a plurality of stripe-like address electrodes 12 are disposed in parallel with each other in the direction orthogonal to scan electrodes 4 and sustain electrodes 5 of front panel 2. Primary dielectric layer 13 coats the address electrodes. Further, on primary dielectric layer 13 between address electrodes 12, barrier ribs 14 having a predetermined height are formed to partition discharge space 16. Phosphor layers 15 are sequentially applied to the grooves between barrier ribs 14 so that ultraviolet light excites the phosphor layers to emit light in red, blue, or green for each address electrode 12. Discharge cells are formed in the positions where scan electrodes 4 and sustain electrodes 5 intersect with address electrodes 12. The discharge cells that include phosphor layers 15 in red, blue, and green, and are arranged in the direction of display electrodes 6 form pixels for color display.

Figure 2:
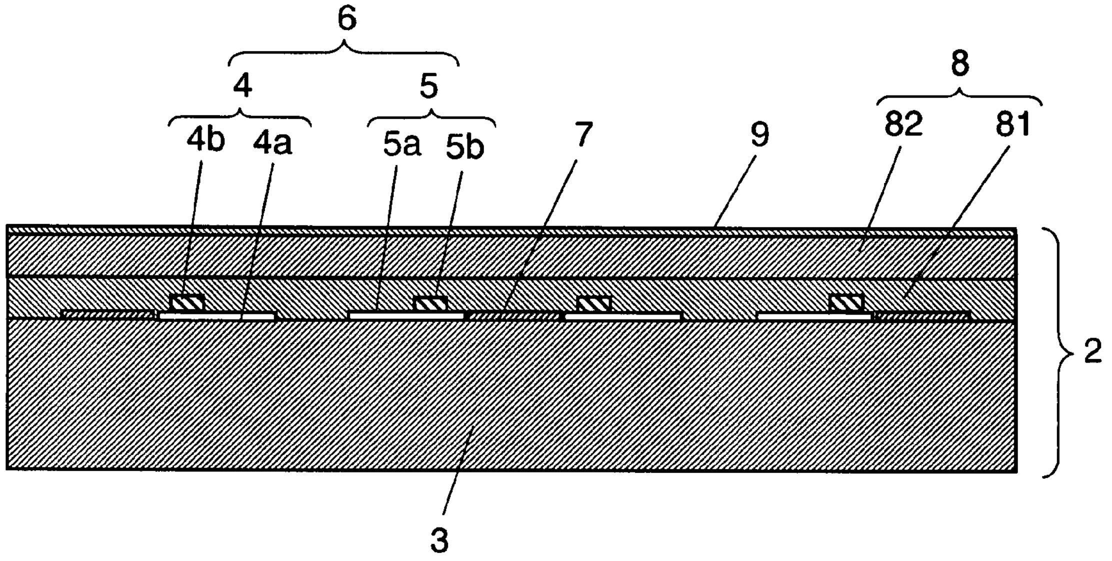
FIG. 2 is a sectional view illustrating a structure of a front panel of the PDP in accordance with the exemplary embodiment of the present invention.

FIG. 2 is a sectional view illustrating a structure of front panel 2 of the PDP in accordance with the exemplary embodiment of the present invention. FIG. 2 shows a vertically inverted view of FIG. 1. As shown in FIG. 2, display electrodes 6, each made of scan electrode 4 and sustain electrode 5, and black stripes 7 are patterned on front glass substrate 3 made by the float method or the like. Scan electrodes 4 and sustain electrodes 5 include transparent electrodes **4*a* and 5*a* made of indium tin oxide (ITO) or tin oxide ($SnO_2$), and metal bus electrodes 4*b* and 5*b* formed on transparent electrodes 4*a* and 5*a*, respectively. Metal bus electrodes 4*b* and 5*b* are used to impart electrical conductivity to transparent electrodes 4*a* and 5*a*** in the longitudinal direction thereof, and made of a conductive material essentially consisting of silver (Ag) material.

Dielectric layer 8 is structured of at least two layers: first dielectric layer 81 that covers these transparent electrodes **4*a* and 5*a*, metal bus electrodes 4*b* and 5*b*, and black stripes 7 formed on front glass substrate 3; and second dielectric layer 82 formed on first dielectric layer 81. Further, protective layer 9 is formed on second dielectric layer 82**.

Next, a description is provided of a method of manufacturing a PDP. First, scan electrodes 4, sustain electrodes 5, and lightproof layers 7 are formed on front glass substrate 3. These transparent electrodes **4*a* and 5*a*, and metal bus electrodes 4*b* and 5*b* are patterned by methods including the photolithography method. Transparent electrodes 4*a* and 5*a* are formed by the thin film process or the like. Metal bus electrodes 4*b* and 5*b* are solidified by firing a paste containing silver (Ag) material, at a predetermined temperature. Lightproof layers 7** are formed by the similar method. A paste containing a black pigment is silk-screened, or a black pigment is applied to the entire surface of the glass substrate and patterned by the photolithography method. Then, the paste or the pigment is fired.

Next, a dielectric paste is applied to front glass substrate 3 to cover scan electrodes 4, sustain electrodes 5, and lightproof layers 7 by the die coat method or the like, to form a dielectric paste layer (dielectric material layer). Leaving the dielectric paste for a predetermined period after application levels the surface of the applied dielectric paste and provides a flat surface. Thereafter, solidifying the dielectric paste layer by firing forms dielectric layer 8 covering scan electrodes 4, sustain electrodes 5, and lightproof layers 7. The dielectric paste is a paint containing dielectric glass, such as glass powder, as well as a binder, and a solvent. Next, protective layer 9 made of magnesium oxide (MgO) is formed on dielectric layer 8 by vacuum deposition. With these steps, a predetermined structure (scan electrodes 4, sustain electrodes 5, lightproof layers 7, dielectric layer 8, and protective layer 9) is formed on front glass substrate 3. Thus, front panel 2 is completed.

On the other hand, rear panel 10 is formed in the following process. First, a material layer to be a structure for address electrodes 12 is made by silk-screening a paste containing silver (Ag) material on rear glass substrate 11, or forming a metal layer on the entire rear glass substrate followed by patterning the layer by the photolithography method. Then, the structure is fired at a predetermined temperature, to form address electrodes 12. Next, on rear glass substrate 11 having address electrodes 12 formed thereon, a dielectric paste is applied to cover address electrodes 12 by the die coat method or the like, to form a dielectric paste layer. Thereafter, the dielectric paste layer is fired into primary dielectric layer 13. The dielectric paste is a paint containing dielectric glass, such as glass powder, as well as a binder, and a solvent.

Next, a paste containing a barrier rib material for forming barrier ribs is applied to primary dielectric layer 13 and patterned into a predetermined shape to form a barrier rib material layer. Then, the material layer is fired to form barrier ribs 14. The usable methods of patterning the barrier rib paste applied to primary dielectric layer 13 include the photolithography method and sandblast method. Next, a phosphor paste containing a phosphor material is applied to primary dielectric layer 13 between adjacent barrier ribs 14 and the side surfaces of barrier ribs 14 and fired, to form phosphor layers 15. With these steps, rear panel 10 including predetermined structural members formed on rear glass substrate 11 is completed.

Front panel 2 and rear panel 10 including predetermined structural members manufactured as above are faced with each other so that scan electrodes 4 are orthogonal to address electrodes 12. Then, the peripheries of the panels are sealed with glass frits, and a discharge gas including Ne and Xe is charged into discharge space 16. Thus, PDP 1 is completed.

Next, a detailed description is provided of first dielectric layer 81 and second dielectric layer 82 constituting dielectric layer 8 of front panel 2. The dielectric material of first dielectric layer 81 is composed of the following components: 20 to 40 wt % of bismuth oxide ($Bi_2O_3$); 0.5 to 15 wt % of calcium oxide (CaO); and 0.1 to 7 wt % of at least one selected from molybdenum trioxide ($MoO_3$), tungstic trioxide ($WO_3$), cerium dioxide ($CeO_2$), and manganese dioxide ($MnO_2$).

Further, the dielectric material contains 0.5 to 12 wt % of at least one selected from strontium oxide (SrO) and barium oxide (BaO).

In place of molybdenum trioxide ($MoO_3$), tungstic trioxide ($WO_3$), cerium dioxide ($CeO_2$), and manganese dioxide ($MnO_2$), the dielectric material may contain 0.1 to 7 wt % of at least one selected from cupper oxide (CuO), chromium oxide ($Cr_2O_3$), cobalt oxide ($CO_2O_3$), vanadium oxide ($V_2O_7$), and antimony oxide ($Sb_2O_3$).

In addition to the above components, the dielectric material may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

The dielectric material having such composition is pulverized with a wet jet mill or ball mill to have an average particle diameter ranging from 0.5 to 2.5 to provide a dielectric material powder. Next, 55 to 70 wt % of this dielectric material powder and 30 to 45 wt % of binder components are sufficiently kneaded with a three-roll kneader, to provide a paste of the first dielectric layer for die coat or printing. The binder components include ethylcellulose, terpioneol containing 1 to 20 wt % of acrylate resin, or butyl carbitol acetate. As needed, the paste may additionally contain dioctyl phthalate, dibutyl phthalate, triphenyl phosphate, or tributyl phosphate, as a plasticizer, and glycerol monooleate, sorbitan sesquioleate, or alkyl aryl phosphate esters, as a dispersant, to improve printability.

Next, the paste of the first dielectric layer is applied to front glass substrate 3 to cover display electrodes 6 by the die coat or silk-screen printing method, and dried. Thereafter, the paste is fired at a temperature ranging from 575 to 590° C., slightly higher than the softening point of the dielectric material, to provide first dielectric layer 81.

Next, a description is provided of second dielectric layer 82. The dielectric material of second dielectric layer 82 is composed of the following components: 11 to 40 wt % of bismuth oxide ($Bi_2O_3$); 6.0 to 28 wt % of barium oxide (BaO); and 0.1 to 7 wt % of at least one selected from molybdenum trioxide ($MoO_3$), tungstic trioxide ($WO_3$) cerium dioxide ($CeO_2$), and manganese dioxide ($MnO_2$).

The dielectric material further contains 0.8 to 17 wt % of at least one selected from calcium oxide (CaO) and strontium oxide (SrO).

In place of molybdenum trioxide ($MoO_3$), tungstic trioxide ($WO_3$), cerium dioxide ($CeO_2$), and manganese dioxide ($MnO_2$), the dielectric material may contain 0.1 to 7 wt % of at least one selected from cupper oxide (CuO), chromium oxide ($Cr_2O_3$), cobalt oxide ($Co_2O_3$), vanadium oxide ($V_2O_7$), and antimony oxide ($Sb_2O_3$).

In addition to the above components, the dielectric material may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

The dielectric material having such composition is pulverized with a wet jet mill or ball mill to have an average particle diameter ranging from 0.5 to 2.5 μm, so that a dielectric material powder is provided. Next, 55 to 70 wt % of this dielectric material powder and 30 to 45 wt % of binder components are sufficiently kneaded with a three-roll kneader, to provide a paste of the second dielectric layer for die coat or printing. The binder components include ethylcellulose, terpioneol containing 1 to 20 wt % of acrylate resin, or butyl carbitol acetate. As needed, the paste may additionally contain dioctyl phthalate, dibutyl phthalate, triphenyl phosphate, or tributyl phosphate, as a plasticizer, and glycerol monooleate, sorbitan sesquioleate, or alkyl aryl phosphate esters, as a dispersant, to improve printability.

Next, the paste of the second dielectric layer is applied to first dielectric layer 81 by the silk-screen printing method or the die coat method, and dried. Thereafter, the paste is fired at a temperature ranging from 550 to 590° C., slightly higher than the softening point of the dielectric material, to provide second dielectric layer 82. Thus, dielectric layer 8 is formed.

The advantage of increasing the brightness of the panel and decreasing the discharge voltage is more distinct at the smaller thickness of dielectric layer 8. For this reason, preferably, the thickness is as small as possible within the range in which the dielectric voltage does not decrease. From the viewpoints of these conditions and visible-light transmittance, in this exemplary embodiment of the present invention, the thickness of dielectric layer 8 is up to 41 μm, with that of first dielectric layer 81 ranging from 5 to 15 μm and that of second dielectric layer 82 ranging from 20 to 36 μm.

For second dielectric layer 82 with a content of bismuth oxide ($Bi_2O_3$) up to 11 wt %, coloring is unlikely to occur, but bubbles are likely to foam in second dielectric layer 82. Thus, such a content is not preferable. With a content of bismuth oxide ($Bi_2O_3$) exceeding 40 wt %, coloring is likely to occur. For this reason, such a content is not preferable to increase the transmittance.

Further, it is necessary that there should be a difference in the content of bismuth oxide ($Bi_2O_3$) between first dielectric layer 81 and second dielectric layer 82. This is confirmed by the following phenomenon. When the content of bismuth oxide ($Bi_2O_3$) is the same in first dielectric layer 81 and second dielectric layer 82, the bubbles generated in first dielectric layer 81 also generates bubbles in second dielectric layer 82 during the step of firing second dielectric layer 82.

When the content of bismuth oxide ($Bi_2O_3$) in second dielectric layer 82 is smaller than that of bismuth oxide ($Bi_2O_3$) in first dielectric layer 81, the following advantage is given. Because second dielectric layer 82 accounts for at least approx. 50% of the total thickness of dielectric layer 8, an yellowing phenomenon of coloring is unlikely to occur and thus the transmittance can be increased. Further, because the Bi-based materials are expensive, the cost of the raw materials to be used can be reduced.

On the other hand, when the content of bismuth oxide ($Bi_2O_3$) in second dielectric layer 82 is larger than the content of bismuth oxide ($Bi_2O_3$) in the first dielectric layer, the softening point of second dielectric layer 82 can be lowered and thus removal of bubbles in the firing step can be promoted.

It is confirmed that a PDP manufactured in this manner can provide front glass substrate 3 having a minimized coloring (yellowing) phenomenon, and dielectric layer 8 having no bubbles generated therein and an excellent dielectric strength, even with the use of a silver (Ag) material for display electrodes 6.

Next, consideration is given to the reasons why these dielectric materials inhibit yellowing or foaming in first dielectric layer 81, in a PDP in accordance with the exemplary embodiment of the present invention. It is known that addition of molybdenum trioxide ($MoO_3$) or tungstic trioxide ($WO_3$) to dielectric glass containing bismuth oxide ($Bi_2O_3$) is likely to generate compounds, such as $Ag_2MoO_4$, $Ag_2Mo_2O_7$, $Ag_2Mo_4O_{13}$, $Ag_2WO_4$, $Ag_2W_2O_7$, and $Ag_2W_4O_{13}$, at low temperatures up to 580° C. In the exemplary embodiment of the present invention, the firing temperature of dielectric layer 8 ranges from 550 to 590° C. Thus, silver ions ($Ag^+$) diffused in dielectric layer 8 during firing react with molybdenum trioxide ($MoO_3$), tungstic trioxide ($WO_3$), cerium dioxide ($CeO_2$), or manganese dioxide ($MnO_2$) in dielectric layer 8, generate stable compounds, and stabilize. In other words, because the silver ions ($Ag^+$) are not reduced and are stabilized, the ions do not coagulate into colloids. Consequently, the stabilization of the silver ions ($Ag^+$) decreases oxygen generated by colloidization of silver (Ag), thus reducing the bubbles generated in dielectric layer 8.

On the other hand, preferably, the content of molybdenum trioxide ($MoO_3$), tungstic trioxide ($WO_3$), cerium dioxide ($CeO_2$), or manganese dioxide ($MnO_2$) in the dielectric glass containing bismuth oxide ($Bi_2O_3$) is at least 0.1 wt %, to offer these advantages. More preferably, the content ranges from 0.1 to 7 wt %. Particularly with a content up to 0.1 wt %, the advantage of inhibiting yellowing is smaller. With a content of at least 7 wt %, yellowing occurs in the glass, and thus is not preferable.

Calcium oxide (CaO) contained in the first dielectric layer works as an oxidizer in the firing step of first dielectric layer 81, and has an effect of promoting removal of binder components remaining in the electrodes. On the other hand, barium oxide (BaO) contained in second dielectric layer 82 has an effect of increasing the transmittance of second dielectric layer 82.

In other words, for dielectric layer 8 of the PDP in accordance with the exemplary embodiment of the present invention, first dielectric layer 81 in contact with metal bus electrodes **4*b* and 5*b* made of a silver (Ag) material inhibits the yellowing phenomenon and foaming therein, and second dielectric layer 82 provided on first dielectric layer 81 achieves high light transmittance. This structure can provide a PDP that has extremely minimized foaming and yellowing, and high transmittance in the entire dielectric layer 8**.

Next, a detailed description is provided of the compositions of address electrodes 12, primary dielectric layer 13, and barrier ribs 14 of rear panel 10 of the PDP in accordance with the exemplary embodiment of the present invention.

A photosensitive paste is applied to rear glass substrate 11 by printing or other methods, to form an electrode paste layer. The photosensitive paste is composed of the following components: 70 to 90 wt % of at least silver (Ag) particles; 1 to 15 wt % of binding glass; and 8 to 15 wt % of photosensitive organic binder components including a photosensitive polymer, a photosensitive monomer, a photo-polymerization initiator, and a solvent. The binding glass of the electrode paste contains at least 20 to 50 wt % of bismuth oxide ($Bi_2O_3$) and has a softening point exceeding 550° C. The electrode paste layer is patterned into 100-μm-wide silver (Ag) electrodes by the photolithography method. Then, the electrodes are fired at a temperature ranging from 550 to 570° C. to provide address electrodes 12.

Primary dielectric layer 13 formed on address electrodes 12 is made of dielectric glass powders containing the following components: 23 to 50 wt % of bismuth oxide (($Bi_2O_3$); 1.5 to 8.1 wt % of at least one selected from calcium oxide (CaO), strontium oxide (SrO), and barium oxide (BaO); and 0.2 to 1.0 wt % of at least one selected from molybdenum trioxide ($MoO_3$) and tungstic trioxide ($WO_3$). Titanium oxide ($TiO_2$) or alumina ($Al_2O_3$) having an average particle diameter ranging from 0.1 to 0.5 μm is added to the above dielectric glass power. Particles of titanium oxide ($TiO_2$) or alumina ($Al_2O_3$) are added to improve the function of the primary dielectric layer as a reflecting layer. For these glass powders, the softening point is at least 550° C., the firing temperature ranges from 570 to 590° C., and the thickness ranges from 8 to 15 μm.

In place of molybdenum trioxide ($MoO_3$) and tungstic trioxide ($WO_3$), the dielectric glass may contain 0.1 to 7 wt % of at least one selected from cerium dioxide ($CeO_2$), manganese dioxide ($MnO_2$), cupper oxide (CuO), chromium oxide ($Cr_2O_3$), cobalt oxide ($CO_2O_3$), vanadium oxide ($V_2O_7$), and antimony oxide ($Sb_2O_3$).

In addition to the above components, the dielectric glass may contain components other than lead, such as 0 to 40 wt % of zinc oxide (ZnO), 0 to 35 wt % of boron oxide ($B_2O_3$), 0 to 15 wt % of silicon dioxide ($SiO_2$), and 0 to 10 wt % of aluminum oxide ($Al_2O_3$). The contents of these components are not specifically limited, and are within the range of the contents in the conventional arts.

Barrier ribs 14 provided on primary dielectric layer 13 are made by applying a photosensitive paste to primary dielectric layer 13 by printing and other methods, and formed by the photolithography method. The photosensitive paste contains the following components: 50 to 70 wt % of a glass powder based on silicon oxide ($SiO_2$)-boron oxide ($B_2O_3$)-barium oxide (BaO)-alumina ($Al_2O_3$)-lithium oxide ($LiO_2$); 10 to 25 wt % of at least one of alumina ($Al_2O_3$), zinc oxide (ZnO), and barium oxide (BaO), as a filler; and 8 to 15 wt % of photosensitive organic binder components including a photosensitive polymer, a photosensitive monomer, a photo-polymerization initiator, and a solvent. The paste is fired at a temperature ranging from 570 to 590° C.

In other words, in the PDP in accordance with the exemplary embodiment of the present invention, when address electrodes 12 are formed on rear glass substrate 11 of rear panel 10, address electrodes 12 contain at least silver (Ag) and binding glass, and the binding glass contains at least bismuth oxide ($Bi_2O_3$) and has a softening point exceeding 550° C. For conventional binding glass having a low softening point ranging from 450 to 550° C., highly-reactive bismuth oxide ($Bi_2O_3$) intensely reacts with silver (Ag), or organic binder components in the paste, at a firing temperature almost 100° C. higher than the softening point. This reaction generates bubbles in address electrodes 12 and primary dielectric layer 13 thereon, thus degrading the dielectric strength and the accuracy of the shape of primary dielectric layer 13. Further, this reaction degrades adhesion of primary dielectric layer 13 to barrier ribs 14 formed thereon and causes inclination or chipping of the barrier ribs. In contrast, the binding glass having a softening point of at least 550° C. in accordance with the present invention has less reactivity of silver (Ag) or organic binder components with bismuth oxide ($Bi_2O_3$) and causes less foaming. On the other hand, at a softening point of the binding glass of at least 600° C., adhesion of address electrodes 12 to rear glass substrate 11 or primary dielectric layer 13 deteriorates. Thus, this softening point is not preferable.

In this embodiment, primary dielectric layer 13 is made of dielectric glass including at least bismuth oxide ($Bi_2O_3$) and having a softening point exceeding 550° C. The content of bismuth oxide ($Bi_2O_3$) ranges from 20 to 50 wt %. Such a structure inhibits generation of bubbles in the interface between address electrodes 12 and primary dielectric layer 13, and in primary dielectric layer 13. This inhibition can maintain high accuracy of the shape of barrier ribs 14 formed on the primary dielectric layer, and provide an eco-friendly PDP with excellent display quality.

Additionally, the compositions of address electrodes 12, primary dielectric layer 13, and barrier ribs 14 described above allow the entire rear panel 10 to be made by lead (Pb)-free, eco-friendly materials.

EXAMPLES

As PDPs in accordance with this exemplary embodiment of the present invention, PDPs suitable for a high definition television screen approx. 42 inch in diagonal are fabricated and their performances are evaluated. Each of the PDPs includes discharge cells having 0.15-mm-high barrier ribs at a regular spacing (cell pitch) of 0.15 mm, display electrodes at a regular spacing of 0.06 mm, and a Ne—Xe mixed gas containing 15 vol % of Xe charged at a pressure of 60 kPa.

Table 1 shows samples of the binding glass constituting address electrodes 12 that have different compositions. Table 2 shows samples of the dielectric glass constituting primary dielectric layer 13 that have different compositions. Table 3 shows PDPs fabricated by combination of the samples of address electrodes 12 and the samples of primary dielectric layer 13, and the evaluation results thereof. In this exemplary embodiment, the binding glass and the dielectric glass have the same composition. Sample Nos. 6 and 7 in Tables 1 and 2 have compositions outside the preferable composition range of the present invention.

"Other components" in the columns of Tables 1 and 2 show the components other than lead, such as zinc oxide (ZnO), boron oxide ($B_2O_3$), silicon dioxide ($SiO_2$), and aluminum oxide ($Al_2O_3$), as described above. The contents of these components are not specifically limited, and are within the range of the contents in the conventional arts.

Dielectric layer 8 of front panel 2 has at least two layers and made of the above-mentioned compositions of first dielectric layer 81 and second dielectric layer 82.

TABLE 1

| Composition and softening point of binding | Sample No. of address electrode | | | | | | |
|---|---|---|---|---|---|---|---|
| glass (° C.) | 1 | 2 | 3 | 4 | 5 | 6 | 7 |
| $Bi_2O_3$ | 23 | 30 | 28 | 40 | 50 | 15 | 72 |
| CaO | — | 3.1 | — | 8.1 | — | — | — |
| SrO | — | 1.8 | — | — | — | — | — |
| BaO | 6.4 | 1.5 | 4.8 | — | — | — | 4.0 |
| $MoO_3$ | 0.8 | 0.2 | 0.3 | 0.5 | — | 1.0 | — |
| $WO_3$ | — | — | — | 1.0 | — | — | — |
| Other components** | 70 | 63 | 67 | 50 | 50 | 84 | 24 |
| Softening point(° C.) | 597 | 566 | 560 | 565 | 551 | 610 | 460 |

**"Other components" include no lead.

TABLE 2

| Composition and softening point of dielectric | Sample No. of primary dielectric layer | | | | | | |
|---|---|---|---|---|---|---|---|
| glass(° C.) | 1 | 2 | 3 | 4 | 5 | 6 | 7 |
| $Bi_2O_3$ | 23 | 30 | 28 | 40 | 50 | 15 | 72 |
| CaO | — | 3.1 | — | 8.1 | — | — | — |
| SrO | — | 1.8 | — | — | — | — | — |
| BaO | 6.4 | 1.5 | 4.8 | — | — | — | 4.0 |
| $MoO_3$ | 0.8 | 0.2 | 0.3 | 0.5 | — | 1.0 | — |
| $WO_3$ | — | — | — | 1.0 | — | — | — |
| Other components** | 70 | 63 | 67 | 50 | 50 | 84 | 24 |
| Softening point(° C.) | 597 | 566 | 560 | 565 | 551 | 610 | 460 |

**"Other components" include no lead.

TABLE 3

| Panel No. | Sample No. of address electrode | Sample No. of primary dielectric layer | Number of bubbles in primary dielectric layer | Inclination and chipping of barrier ribs |
|---|---|---|---|---|
| 1 | No. 1 | No. 1 | 3 | None |
| 2 | No. 1 | No. 5 | 8 | Exist |
| 3 | No. 1 | No. 6 | 20 | Exist |
| 4 | No. 1 | No. 7 | 5 | None |
| 5 | No. 2 | No. 2 | 2 | None |
| 6 | No. 2 | No. 6 | 10 | Exist |
| 7 | No. 2 | No. 7 | 18 | Exist |
| 8 | No. 3 | No. 3 | 0 | None |
| 9 | No. 3 | No. 6 | 11 | Exist |
| 10 | No. 3 | No. 7 | 22 | Exist |
| 11 | No. 4 | No. 4 | 1 | None |
| 12 | No. 4 | No. 6 | 8 | Exist |
| 13 | No. 4 | No. 7 | 17 | Exist |
| 14 | No. 5 | No. 5 | 2 | None |
| 15 | No. 5 | No. 6 | 10 | Exist |
| 16 | No. 5 | No. 7 | 12 | Exist |
| 17 | No. 6 | No. 6 | 25 | Many |
| 18 | No. 6 | No. 7 | 30 | Many |
| 19 | No. 7 | No. 7 | 28 | Many |

These PDPs of panel Nos. 1 through 19 are fabricated using these materials, and evaluated for the following items: the number of bubbles generated in primary dielectric layer 13 after the completion of rear panel 10; and inclination and chipping of barrier ribs 14 on primary dielectric layer 13. Table 3 shows the evaluation results.

The results of Table 3 show, when one of the composition of the binding glass of address electrodes 12 and the composition of the dielectric glass of primary dielectric layer 13 is outside the composition range of the present invention, the number of bubbles in primary dielectric layer 13 has increased and inclination or chipping of barrier ribs 14 is seen. Further, when the composition of address electrodes 12 and the composition of primary dielectric layer 13 are both outside the composition range of the present invention, like panel Nos. 17 through 19, the number of bubbles and inclined barrier ribs abnormally increases. Naturally, less foaming increases the dielectric strength of primary dielectric layer 13, and thus achieves a reliable PDP.

The reasons for these results are considered as follows. When the binding glass of address electrodes 12 or the dielectric glass of primary dielectric layer 13 has a low softening point, bubbles are likely to be generated by the reaction of silver (Ag) material or organic binder components with bismuth oxide ($Bi_2O_3$), during firing. On the other hand, when the binding glass or the dielectric glass has a high softening point, the weak adhesion between rear glass substrate 11, address electrodes 12, and primary dielectric layer 13 increases peeling or foaming in the interfaces thereof. In either case, these phenomena induce the defective shapes of primary dielectric layer 13 and barrier ribs 14 formed thereon, thereby causing inclination and chipping of barrier ribs 14.

For the binding glass of the address electrodes and the dielectric glass of the primary dielectric layer, the content of each component described above has a measurement error in the range of approx. ±0.5 wt %. For the address electrodes and primary dielectric layer after firing, the content has a measurement error in the range of approx. ±2 wt %. The contents of the components in the range of the values including these errors can provide the similar advantages of the present invention.

As described above, a PDP in accordance with the exemplary embodiment of the present invention can ensure the accuracy of the shape of the rear panel and provide a lead (Pb)-free, eco-friendly PDP having a high dielectric strength.

INDUSTRIAL APPLICABILITY

As described above, the PDP of the present invention increases the reliability of the rear panel and achieves an eco-friendly PDP with excellent display quality. Thus, the PDP is useful for a large-screen display device and the like.

The invention claimed is:

1. A plasma display panel (PDP) comprising:

a front panel including display electrodes, a dielectric layer, and a protective layer that are formed on a glass substrate; and a rear panel including address electrodes, barrier ribs, and phosphor layers that are formed on a substrate, wherein the front panel and the rear panel are faced with each other, and peripheries thereof are sealed to form a discharge space therebetween, wherein a primary dielectric layer is provided to cover the address electrodes;

the barrier ribs are formed on the primary dielectric layer;

the primary dielectric layer contains a glass component which includes 23 wt % to 50 wt % of bismuth oxide and 0.2 wt % to 1.0 wt % of at least either one selected from molybdenum oxide and tungsten oxide, and 1.5 wt % to 8.1 wt % of at least one selected from calcium oxide, strontium oxide, and barium oxide therein;

wherein the primary dielectric layer is composed of a dielectric glass having a softening point exceeding 550° C.; and the address electrodes contain at least silver; and each of the address electrodes further contains a binding glass which includes 23 wt % to 50 wt % of bismuth oxide;

wherein the address electrodes are composed of a dielectric glass having a softening point exceeding 550° C.

2. The PDP of claim 1, wherein wherein the dielectric layer included in the front panel comprises first and second dielectric layers;

the first dielectric layer is in direct contact with the display electrodes and comprises a first proportion of bismuth oxide in a range of 20-40 wt %, and 0.1-7 wt % of at least one of molybdenum oxide, tungstic oxide, cerium dioxide, and manganese dioxide; and the second dielectric layer is in direct contact with the first dielectric layer and comprises a second proportion of bismuth oxide, less than the first proportion of bismuth oxide, in a range of 11-40 wt %, and 0.1-7 wt % of at least one of molybdenum oxide, tungstic oxide, cerium dioxide, and manganese dioxide.

3. The PDP of claim 2, wherein the display electrodes comprise silver.

4. The PDP of claim 2, wherein the second dielectric layer accounts for at least approximately 50% of the total thickness of the dielectric layer included in the front panel.

* * * * *